(12) United States Patent
Liu

(10) Patent No.: US 12,013,946 B2
(45) Date of Patent: Jun. 18, 2024

(54) BASEBOARD MEMORY CONTROLLER (BMC) RELIABILITY AVAILABILITY AND SERVICEABILITY (RAS) DRIVER FIRMWARE UPDATE VIA BASIC INPUT/OUTPUT SYSTEM (BIOS) UPDATE RELEASE

(71) Applicant: Dell Products L.P., Round Rock, TX (US)

(72) Inventor: Wei G. Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 17/868,228

(22) Filed: Jul. 19, 2022

(65) Prior Publication Data
US 2024/0028729 A1    Jan. 25, 2024

(51) Int. Cl.
*G06F 21/57*    (2013.01)
*G06F 8/65*    (2018.01)
*G06F 9/4401*    (2018.01)

(52) U.S. Cl.
CPC .............. *G06F 21/572* (2013.01); *G06F 8/65* (2013.01); *G06F 9/4411* (2013.01)

(58) Field of Classification Search
CPC ......... G06F 21/572; G06F 8/65; G06F 9/4411
See application file for complete search history.

(56) References Cited

U.S. PATENT DOCUMENTS

| | | | |
|---|---|---|---|
| 11,036,543 B1* | 6/2021 | Swanson | G06F 13/102 |
| 11,314,665 B2* | 4/2022 | Osada | G06F 13/1668 |
| 11,716,383 B2* | 8/2023 | Kim | G06F 9/455 |
| 2011/0231697 A1 | 9/2011 | Berke et al. | |
| 2019/0108892 A1 | 4/2019 | Berke et al. | |
| 2020/0326925 A1* | 10/2020 | Nachimuthu | G06F 8/65 |
| 2022/0398320 A1* | 12/2022 | Maddukuri | G06F 21/31 |
| 2023/0273885 A1* | 8/2023 | Gardner | G06F 13/1668 713/2 |
| 2024/0028433 A1* | 1/2024 | Tsai | G06F 11/0751 |

FOREIGN PATENT DOCUMENTS

WO    WO-2015078217 A1 *    6/2015    ........... G06F 9/4411
WO    WO-2020066552 A1 *    4/2020

* cited by examiner

*Primary Examiner* — Tammara R Peyton
(74) *Attorney, Agent, or Firm* — Larson Newman, LLP

(57) ABSTRACT

An information handling system includes a memory, a basic input/output system (BIOS), and a baseboard memory controller (BMC). The memory stores a current BMC reliability, availability, and serviceability (RAS) driver. The BIOS receives a firmware update release. The firmware update release includes a first BMC RAS driver. The BIOS stores the first BMC RAS driver in a predetermined location of the memory. The BMC reads the first BMC RAS driver from the memory. The BMC also determines whether a first version of the first BMC RAS driver is different than a second version of a second BMC RAS version loaded in the BMC. In response to the first and second versions being different, the BMC loads the first BMC RAS driver.

20 Claims, 5 Drawing Sheets

BASEBOARD MEMORY CONTROLLER (BMC) RELIABILITY AVAILABILITY AND SERVICEABILITY (RAS) DRIVER FIRMWARE UPDATE VIA BASIC INPUT/OUTPUT SYSTEM (BIOS) UPDATE RELEASE

FIELD OF THE DISCLOSURE

This disclosure generally relates to information handling systems, and more particularly relates to providing a BMC RAS offload driver update via a BIOS update release for an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a memory that may store a current BMC reliability, availability, and serviceability (RAS) driver. A BIOS may receive a firmware update release. The firmware update release includes a first BMC RAS driver. The BIOS may store the first BMC RAS driver in a predetermined location of the memory. A BMC may read the first BMC RAS driver from the memory. The BMC also may determine whether a first version of the first BMC RAS driver is different than a second version of a second BMC RAS version loaded in the BMC. In response to the first and second versions being different, the BMC may load the first BMC RAS driver.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
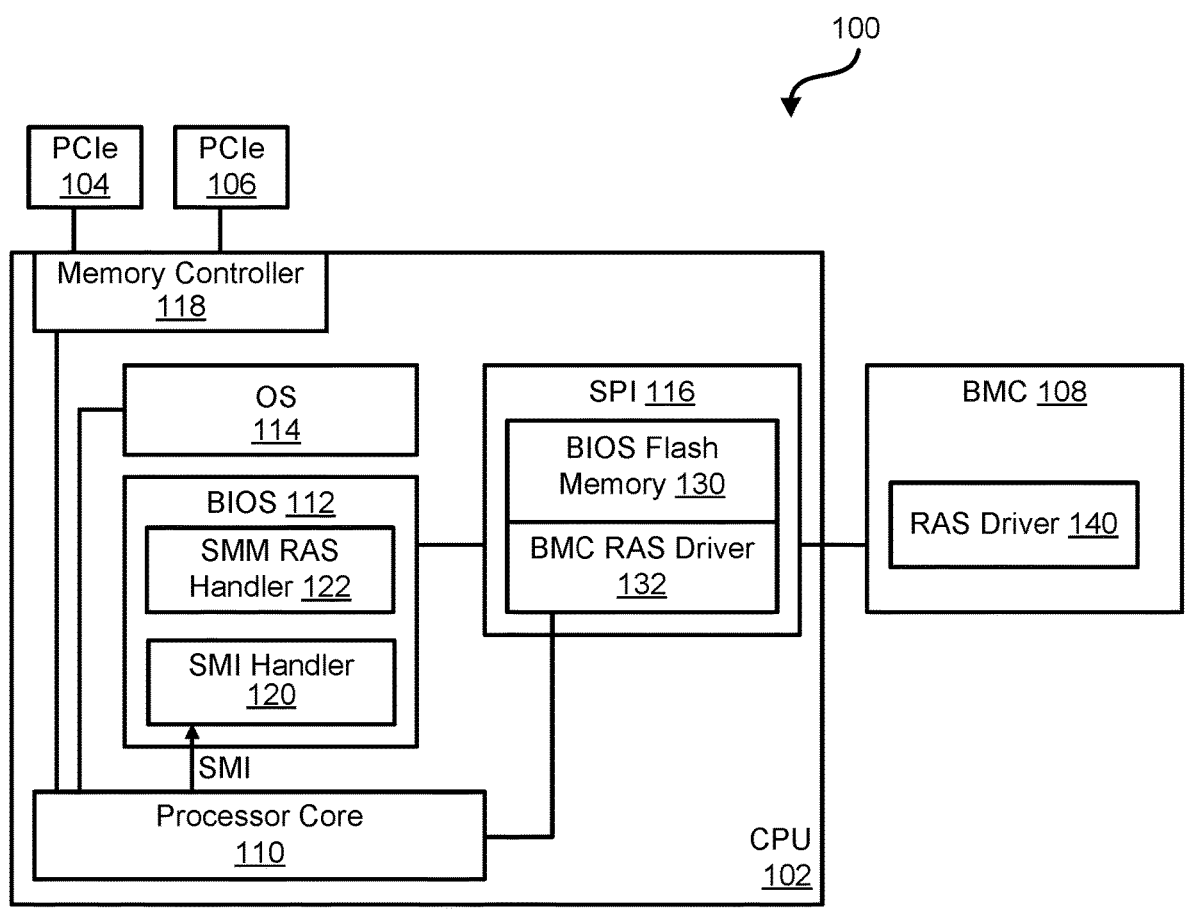
FIG. 1 is block diagram of a portion of an information handling system according to at least one embodiment of the disclosure.

FIG. 1 shows an information handling system 100 including central processing unit (CPU) 102. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 includes CPU 102, peripheral component interconnect express (PCIe) devices 104 and 106, and a baseboard management controller 108. In an example, the information handling system 100 can be a server, a personal computer, a laptop computer, or the like. PCIe devices may include, but are not limited to, dual in-line memory modules (DIMMs), embedded serial advanced technology attachment (SATA) devices, redundant array of independent disks (RAID) controllers, NICs, PCIe solid-state drives (SSDs), and integrated network interface cards (NICs).

CPU 102 includes a processor core 110, a basic input/output system (BIOS) 112, an operating system (OS) 114, a serial peripheral interface (SPI) chip 116, and a memory controller 118. BIOS 112 includes a system management interrupt (SMI) handler 120 and a system management mode (SMM) reliability, availability, and serviceability (RAS) error handler 122, both of which in turn may be firmware processes executed by CPU 102. SPI chip 116 includes a BIOS flash memory 130, which in turn may store a BMC RAS driver 140. BMC 108 may include RAS driver 140. In different examples, RAS driver 132 may be stored in either BIOS flash memory 130 or BMC 108 as RAS driver 140, both of which are illustrated in FIG. 1. BMC 108 may know where BMC RAS driver 132 is stored, such that the BMC may retrieve and execute the BMC RAS driver in either location to correct RAS errors.

In an example, processor 110 may perform one or more operations via OS 114. In an embodiment, PCIe devices 104, 106, and 108 may be assigned with CPU 102. In an example, information handling system 100 and CPU 102 may each include additional components without varying from the scope of this disclosure. For example, CPU 102 may be a multicore CPU, such that the CPU may include more processor cores than just processor core 110, and more memory controllers. In this example, each processor core may have one or more DIMMs assigned to the processor core.

Processor core 110 may operate to provide data and control interfaces to one or more PCIe devices, such as DIMMs in accordance with a particular memory architecture. For example, processor core 110 and the off-package DIMMs may operate in accordance with a Double-Data Rate (DDR) standard, such as a JEDEC DDR4 or DDR5 standard. Memory 140 may be any suitable type of memory including, but not limited to, a system management random access memory (SMRAM) located internally on the processor package itself, such as in PCI chip 116. In an example, SMRAM may include dedicated code, such as SMI handling code, SMM RAS error handling code, BMC driver code, and data defined a build time. In this example, the SMI handling code may enable CPU 102 to appropriately respond to each individual SMI source.

Referring back to FIG. 1, during runtime of information handling system 100 one or more components, such as processor core 110, may monitor for errors in PCIe devices 104, 106, and 108. In certain examples, these errors may be correctable errors, uncorrectable errors, uncorrectable no action (UNCA) errors, or the like. If a detected error is an uncorrectable error, processor core 110 may provide a SMI to SMI handler 120 of BIOS 112 firmware. In response to the SMI, SMI handler 120 may cause CPU 102 to enter a SMNI. While in the SMNI, CPU 102 may execute SMNI RAS error handler 122 to collect and log information associated with the uncorrectable error. For example, BIOS 112 may retrieve the available data or information for a PCIe device that had the uncorrectable error.

If an error is a correctable error, processor core 110 may provide a SMI to BIOS 112. However, due to SMI latency and security concerns with respect to handling SMIs in BIOS 112, some correctable RAS error handling may be moved from the BIOS to BMC 108. This process of moving correctable RAS error handling to BMC 108 may be referred to as BMC RAS offload. In certain examples, BMC 108 may be notified to execute the BMC RAS offload based on any suitable indication including, but not limited to, a SMI, a signal on a error pin between in between BIOS 112 and the BMC, a signal from a GPIO to the BMC, and BMC polling a register within the BIOS or other component of CPU 102. In an example, based on a SMI for a correctable RAS error, BIOS 112 may utilize a BMC driver within BIOS flash memory 130 to pass the SMI to RAS driver 140 in BMC 108. In this example, RAS knowledge and policy may be stored within the chipset/platform-specific BIOS 112, such as in BIOS flash memory 130. While this data is stored with BIOS flash memory 130, the runtime RAS, such as certain correctable errors, may be handled by BMC 108. In this situation, BMC 108 may be a pass though media, which in turn may greatly simplify BMC implementation of the RAS error correction. In an example, while BMC 108 is performing the RAS error corrections, CPU 102 may continue performing other operations.

In an example, RAS driver 132 may need updates related to fixes or policy changes. The fixes or policy changes may be any suitable RAS updates, such as updates to fix a threshold number of errors before an error warning is triggered. In an example, RAS updates may be provided within any other update releases, such as update releases for BMC 108. In certain examples, the frequency of update releases for BIOS 112 and BMC 108 may vary with respect to each other. For example, updates to BIOS 112 may be released somewhere between four to eight times a year, and updates to BMC 108 may be released only around two times a year. In this example, if updates for RAS fixes in RAS driver 132 are pushed with update releases for BMC 108, the RAS related fixes or policy changes may not be rolled out at a timely manner. Information handling system 100 may be improved by the RAS related updates being provided with update releases for BIOS 112 instead of with update releases for BMC 108 as will be described herein.

In certain examples, BMC 108 may store minimum platform and chipset specific data, and BIOS 112 may store the majority of this data. While the BMC RAS driver may be carried or stored in BMC 108 or BIOS 112, for brevity and clarity, the BMC RAS driver will be discussed herein as being stored in BIOS 112. In this situation, updates to RAS handling driver 132 and a policy driver may be included in the BIOS releases. In response to a BIOS release having an update to RAS driver 132 and policy driver being received, the RAS driver and the policy driver be packaged and stored in BIOS flash memory 130 of SPI chip 116 as shown in FIG. 2.

Figure 2:
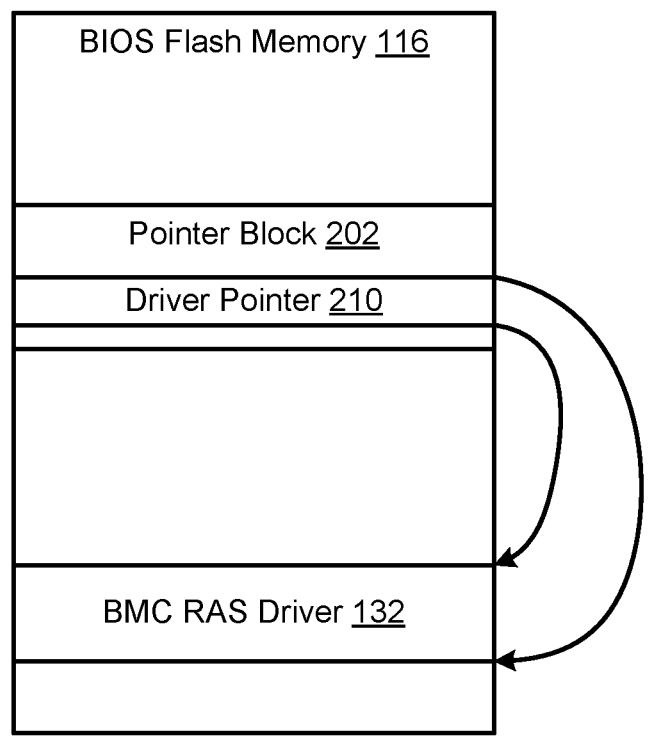
FIG. 2 is a basic input/output system flash memory according to a specific embodiment of the present disclosure.

Referring to FIG. 2, BMC RAS driver 132 may be stored either at a fixed location/range or at a dynamic location within BIOS flash memory 116, as long as BMC 108 may be able to identify and load the RAS driver. In an example, BIOS flash memory 116 may include a pointer block 202, which in turn may include a driver pointer 210. Pointer block 202 may be an immutable region in BIOS flash memory 116, and BMC 108 may be able to access the pointer block during a root of trust check. In an example, BMC 108 may be able to access the immutable region of pointer block 202 at any power state of CPU 102, such as during a S5 state. In certain examples, BMC 108 may retrieve address pointer 210 from pointer block 202. Based on address pointer 210, BMC 108 may retrieve RAS driver 132, and store a version within a memory of the BMC.

Referring to FIG. 1, BMC 108 may include logic to ensure that the BMC is utilizing the correct RAS driver 132. For example, BMC 108 may synchronize a copy of RAS driver 140 stored in the BMC with the corresponding RAS driver 132 stored in BIOS flash memory 130. In this example, BMC 108 may synchronize the version of RAS driver 140 on the BMC to be substantially the same as RAS driver 132 in BIOS flash memory 130. In an example, BMC 108 may perform this synchronization even if RAS driver 132 in BIOS flash memory 130 is a previous version. In certain examples, the RAS code and BIOS chipset initialization code may include dependency between each other, such that the version of RAS driver code stored in BIOS 112 is needed. If a current version RAS driver 140 in BMC 108 is different than the version in BIOS 112, the BMC may load the version from BIOS SPI chip 116. In an example, when BMC 108 loads RAS driver 162 from BIOS 112, the BMC may perform security checks and authentications prior to storing the RAS driver. In an example, the security checks and authentications may be easily achieved via an implementation by a root of trust implementation within BMC 108. For example, BMC 108 may carry a BIOS public key for signing BMC driver 132, such that the BMC may verify the BMC driver.

Figure 3:
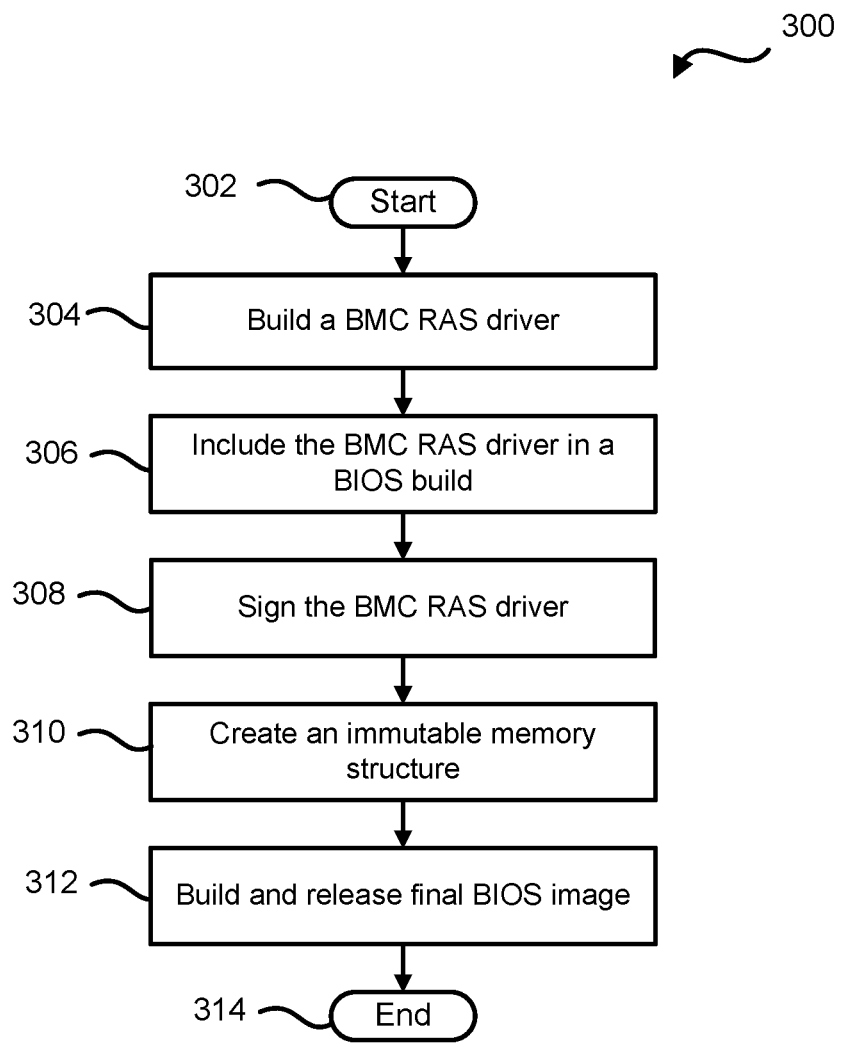
FIG. 3 is a flow diagram of a method for creating a firmware image including a baseboard management controller (BMC) reliability, availability, and serviceability (RAS) driver according to a specific embodiment of the present disclosure.

FIG. 3 shows a method for creating a firmware image including a BMC RAS driver according to a specific embodiment of the present disclosure, starting at block 302. In an example, the method 300 may be performed by any suitable component including, but not limited to, BIOS 112 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 304, a BMC RAS driver is built. In an example, the BMC RAS driver may be built or created by any suitable component offline. As used herein, offline refers to the component not actively communicating with another component. In an example, the BMC RAS driver may be an update to a previous version of the BMC RAS driver, a downgraded version, or the like. The built BMC RAS driver may provide RAS related fixes or policy changes. At block 306, the BMC RAS driver is includes in a BIOS build. In an example, the BMC RAS driver may be included in any suitable format, such as a binary format, within the BIOS build. In certain examples, the BIOS build may be an update to a BIOS firmware image.

At block 308, the BMC RAS driver is signed. In an example, the BMC RAS driver may be signed with a private key associated with a BIOS of an information handling system. At block 310, an immutable memory structure is created in a memory. In an example, the memory may be a BIOS flash memory. The immutable memory structure may include data to point to a location of the BMC RAS driver and a corresponding hash value. At block 312, a final BIOS image is built and released, and the flow ends at block 314. In an example, the final BIOS image may be a firmware image update for the BIOS of an information handling system, and the final BIOS image may be release via a firmware update package.

Figure 4:
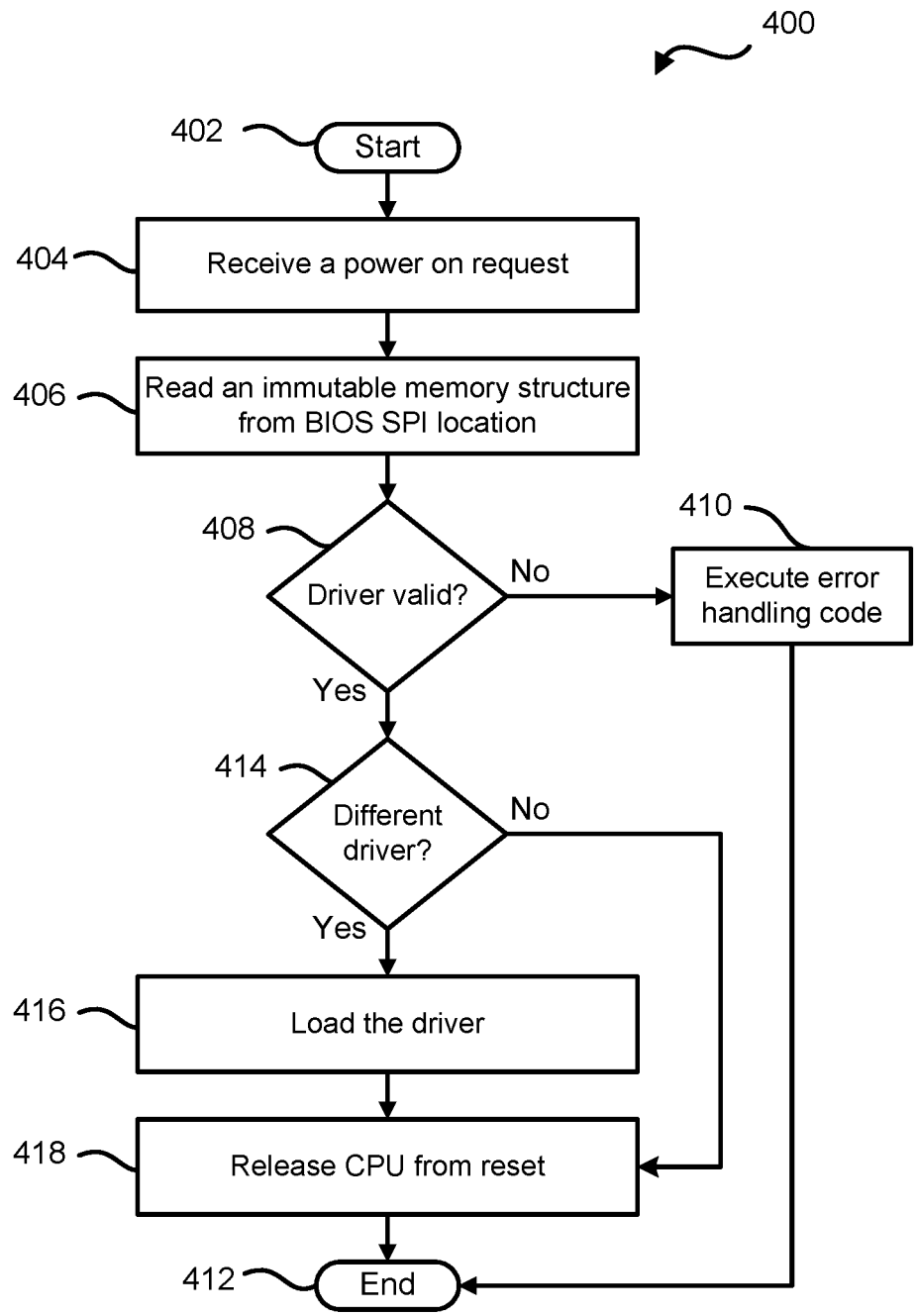
FIG. 4 is a flow diagram of a method for updating a BMC RAS offload driver in BIOS firmware releases according to an embodiment of the present disclosure.

FIG. 4 illustrates a method 400 for updating a BMC RAS offload driver in BIOS firmware releases according to an embodiment of the present disclosure, starting at block 402. In an example, the method 400 may be performed by any suitable component including, but not limited to, BMC 108 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 404, a power on request is received. In an example, the power on request may be received at a BMC of an information handling system. At block 406, an immutable memory structure is read from a BIOS SPI location. The immutable memory structure may include a table that includes identifiers for different drivers and corresponding locations of the drivers within a BIOS flash memory. In certain examples, the immutable memory structure may include a pointer to a BMC RAS driver within the BIOS SPI. Based on the pointer, the BMC may retrieve the corresponding BMC RAS driver.

At block 408, a determination is made whether the BMC RAS driver is valid. In an example, the determination may be performed in any suitable manner including, but not limited to, verifying the signature of the BMC RAS driver. The signature verification may be performed based on a hash value for the BMC RAS driver, using a public BIOS key, or the like. If the BMC RAS driver is not valid, error handling code is executed at block 410 and the flow ends at block 412.

If the BMC RAS driver is valid, a determination is made whether a version of the BMC RAS driver is different than a current version of the BMC RAS driver within a BMC of the information handling system at block 414. If the versions are different, the BMC RAS driver in the BIOS flash memory is loaded into the BMC at block 416, a CPU of the information handling system is released from reset at block 418, and the flow ends at block 412. In an example, the BMC RAS driver may also replace an old copy of the BMC RAS driver in a memory of the BMC. If the versions are not different, the CPU is released from reset at block 418 and the flow ends at block 412.

Figure 5:
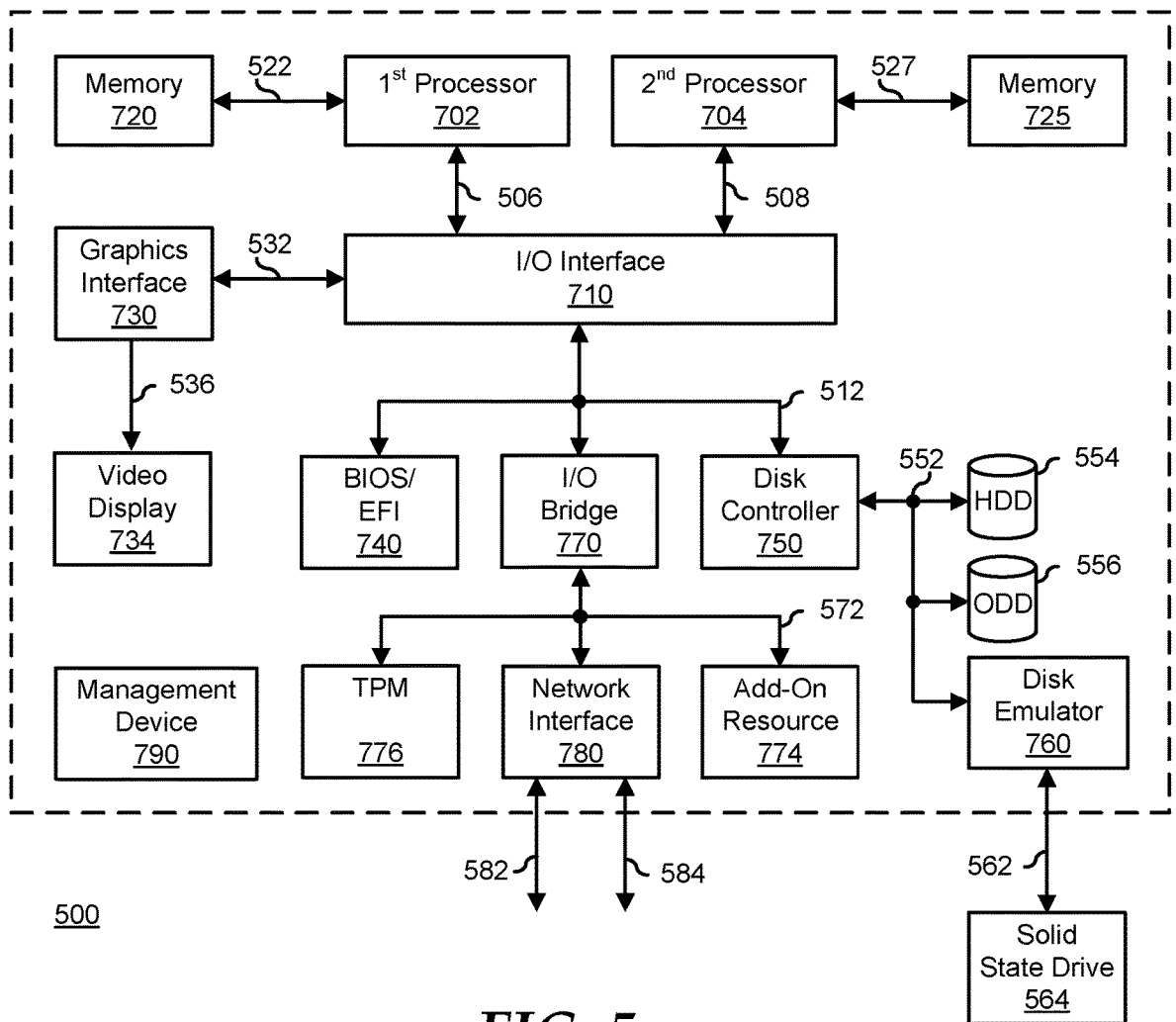
FIG. 5 is a block diagram of a general information handling system according to an embodiment of the present disclosure.

FIG. 5 shows a generalized embodiment of an information handling system 500 according to an embodiment of the present disclosure. Information handling system 500 can include devices or modules that embody one or more of the devices or modules described below and operates to perform one or more of the methods described below. Information handling system 500 includes a processors 502 and 504, an input/output (I/O) interface 510, memories 520 and 525, a graphics interface 530, a basic input and output system/ universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532 and provides a video display output 536 to a video display 534. In a particular embodiment, information handling system 500 includes separate memories that are dedicated to each of processors 502 and 504 via separate memory interfaces. An example of memories 520 and 525 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 3394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512 or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500.

Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a memory to store a current baseboard memory controller (BMC) reliability, availability, and serviceability (RAS) driver;
   a basic input/output system (BIOS) to:
      receive a firmware update release, wherein the firmware update release includes a first BMC RAS driver; and
      store the first BMC RAS driver in a predetermined location of the memory; and
   a BMC to:
      read the first BMC RAS driver from the memory;
      determine whether a first version of the first BMC RAS driver is different than a second version of a second BMC RAS version loaded in the BMC; and
      in response to the first and second versions being different, load the first BMC RAS driver.

2. The information handling system of claim 1, wherein prior to the determination of whether the first and second versions are different, the BMC further to: verify a signature of the first BMC RAS driver.

3. The information handling system of claim 1, wherein the BMC further to: replace the second BMC RAS driver with the first BMC RAS driver within the BMC.

4. The information handling system of claim 1, further comprising:
   a serial peripheral interconnect chip, the serial peripheral interconnect chip to provide communication between the BIOS and the BMC.

5. The information handling system of claim 1, wherein the memory is a BIOS flash memory.

6. The information handling system of claim 1, wherein the first BMC RAS driver is stored in an immutable memory location of the memory.

7. The information handling system of claim 1, wherein in response to the first BMC RAS driver being loaded, the BMC further to perform RAS error corrections.

8. The information handling system of claim 1, wherein the firmware update release is associated with firmware of the BIOS.

9. A method, comprising:
   receiving, by a basic input/output system (BIOS) of an information handling system, a firmware update release that includes a first baseboard memory controller (BMC) reliability, availability, and serviceability (RAS) driver;
   storing, by the BIOS, the first BMC RAS driver in a predetermined location of a memory;
   determining, by a BMC of the information handling system, whether a first version of the first BMC RAS driver is different than a second version of a second BMC RAS version loaded in the BMC; and
   in response to the first and second versions being different, loading, by the BMC, the first BMC RAS driver.

10. The method of claim 9, wherein prior to the determination of whether the first and second versions are different, the method further comprising verify a signature of the first BMC RAS driver.

11. The method of claim 9, wherein the method further comprising replacing the second BMC RAS driver with the first BMC RAS driver within the BMC.

12. The method of claim 9, wherein the method further comprising providing, by a serial peripheral interconnect chip, communication between the BIOS and the BMC.

13. The method of claim 9, wherein the memory is a BIOS flash memory.

14. The method of claim 9, wherein the first BMC RAS driver is stored in an immutable memory location of the memory.

15. The method of claim 9, wherein in response to the first BMC RAS driver being loaded, the method further comprising performing RAS error corrections via the first BMC RAS driver.

16. The method of claim 9, wherein the firmware update release is associated with firmware of the BIOS.

17. An information handling system, comprising:
   a memory to store a current baseboard memory controller (BMC) reliability, availability, and serviceability (RAS) driver;
   a basic input/output system (BIOS) to store a firmware update release including a first BMC RAS driver in a predetermined location of the memory; and
   a BMC to:
      read the first BMC RAS driver from the memory;
      verify a signature of the first BMC RAS driver;
      if the signature is verified, then determine whether a first version of the first BMC RAS driver is different than a second version of a second BMC RAS version loaded in the BMC; and
      if the first and second versions are different, then load the first BMC RAS driver; and
   a serial peripheral interconnect chip to provide communication between the BIOS and the BMC.

18. The information handling system of claim 17, wherein the BMC further to: replace the second BMC RAS driver with the first BMC RAS driver within the BMC.

19. The information handling system of claim 17, wherein the first BMC RAS driver is stored in an immutable memory location of the memory.

20. The information handling system of claim 17, wherein in response to the first BMC RAS driver being loaded, the BMC further to perform RAS error corrections.

* * * * *